United States Patent
Walden et al.

(10) Patent No.: US 8,698,016 B2
(45) Date of Patent: Apr. 15, 2014

(54) CONFIGURATION AND METHOD FOR MOUNTING A KEY TO A DEFLECTION WEB FOR A KEYPAD

(75) Inventors: Norman Walden, Hemer (DE); Ralf Syldatke, Dortmund (DE)

(73) Assignee: BlackBerry Limited, Waterloo (CA)

( * ) Notice: Subject to any disclaimer, the term of this patent is extended or adjusted under 35 U.S.C. 154(b) by 610 days.

(21) Appl. No.: 12/869,896

(22) Filed: Aug. 27, 2010

(65) Prior Publication Data

US 2012/0050166 A1   Mar. 1, 2012

(51) Int. Cl.
*H01H 9/26* (2006.01)
*H01H 13/72* (2006.01)
*H01H 13/76* (2006.01)

(52) U.S. Cl.
USPC .......................................................... 200/5 A

(58) Field of Classification Search
USPC .............. 200/237, 276.1, 295, 321, 341, 345, 200/400, 401, 402, 403, 404, 405, 406, 412, 200/443, 502, 513, 5 A, 5 R, 329, 512
See application file for complete search history.

(56) References Cited

U.S. PATENT DOCUMENTS

| | | | |
|---|---|---|---|
| 4,479,111 A * | 10/1984 | Madsen et al. | 341/27 |
| 5,486,059 A * | 1/1996 | Iwasa et al. | 400/488 |
| 6,121,564 A * | 9/2000 | Huang | 200/345 |
| 6,492,602 B2 * | 12/2002 | Asai et al. | 200/1 B |
| 6,911,608 B2 * | 6/2005 | Levy | 200/5 A |
| 7,157,651 B2 * | 1/2007 | Rix et al. | 200/5 A |
| 7,462,796 B1 * | 12/2008 | Chai | 200/341 |
| 7,489,296 B2 * | 2/2009 | Nishino et al. | 345/157 |
| 7,687,732 B1 * | 3/2010 | Tabata | 200/345 |
| 8,399,789 B2 * | 3/2013 | Nishino et al. | 200/345 |
| 2004/0004559 A1 | 1/2004 | Rast | |
| 2009/0033521 A1 | 2/2009 | Ladouceur et al. | |
| 2009/0107816 A1 * | 4/2009 | Chen et al. | 200/314 |

OTHER PUBLICATIONS

Office Action mailed Mar. 19, 2013, in corresponding Canadian patent application No. 2,732,573.
Web page. NEXUSEU, "Silicon Keypads with Plastic Keytops Design Guide." Available: http://www.nexuseu.com/keymat%20Design%20Guide.pdf.
Web page. EECO, "Silicone Rubber keypads." Available: http://www.eecoswitch.com/PDF%20Files/Elastomer%20Keypads.pdf.

* cited by examiner

*Primary Examiner* — Edwin A. Leon
*Assistant Examiner* — Anthony R. Jimenez
(74) *Attorney, Agent, or Firm* — Novak Druce Connolly Bove + Quigg LLP

(57) ABSTRACT

A keypad assembly comprising one or more keys arranged on a deflection web is provided. Each key may comprise a key cap and a post operatively coupled to the key cap. The deflection web may comprise a web having at least one seat configured to receive the post of the key. An adhesive is provided to bond the post to the seat. The post may comprise a plurality of channels and may further comprise a flange for mating with a shoulder of the seat. The channels and the mating flange and shoulder may provide for better glue distribution between the post and the seat. A method for making the keypad assembly is also provided.

23 Claims, 8 Drawing Sheets

CONFIGURATION AND METHOD FOR MOUNTING A KEY TO A DEFLECTION WEB FOR A KEYPAD

RELEVANT FIELD

The field of this disclosure relates generally to keypads, with particular but by no means exclusive application to keypads of mobile communications devices.

BACKGROUND

A keypad may include a plurality of keys, each of which resides in a cavity of a deflection web. An adhesive such as glue may be used to retain each key in its respective cavity. When a key is depressed, the deflection web may resiliently deform and trigger a sensor, which generates a signal indicating that the key has been depressed.

BRIEF DESCRIPTION OF THE DRAWINGS

Embodiments are described in further detail below, by way of example only, with reference to the accompanying drawings, in which.

DETAILED DESCRIPTION

In one broad aspect, there is provided a key for a keypad. The key comprises a key cap and a post operatively coupled to the key cap. The post comprises a plurality of channels.

In another broad aspect there is provided a keypad assembly. The keypad assembly comprises at least one key having a keycap and a post comprising a plurality of channels and a deflection web having at least one seat configured to receive the post. The seat comprises an open end and a closed end remote from the open end as well as a shoulder intermediate the open end and the closed end.

In another broad aspect there is provided a method of making a keypad. The method comprises providing a key comprising a key cap and a post operatively coupled to the key cap, wherein the post comprises a plurality of channels; providing a deflection web having at least one seat configured to receive the post; providing an adhesive; and inserting the key into the seat.

Some embodiments of the system and methods described herein make reference to a mobile device. A mobile device may be a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities), for example. A mobile device may communicate with other devices through a network of transceiver stations.

Figure 1:
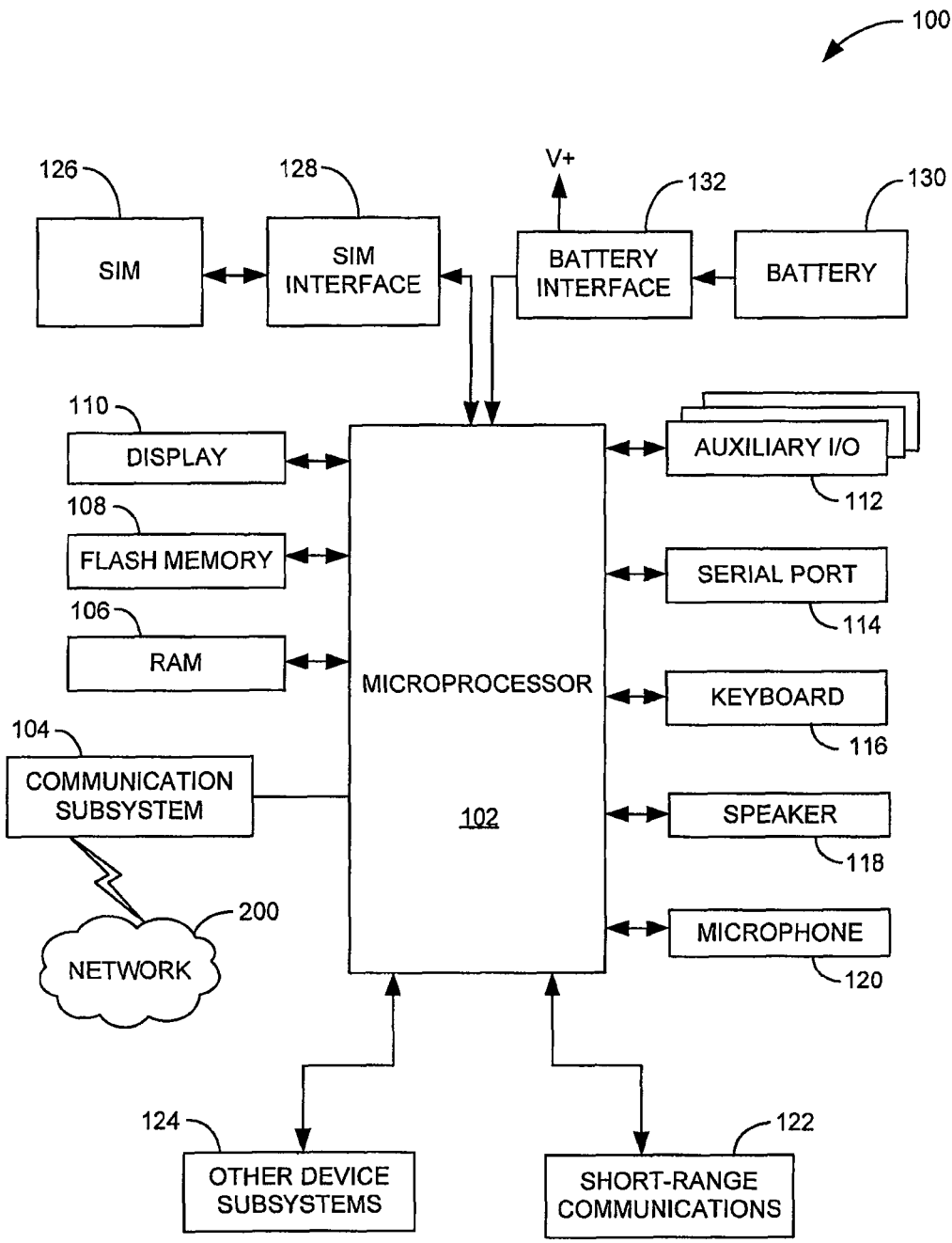
FIG. 1 is a block diagram of a mobile device in one example implementation.
Figure 2:
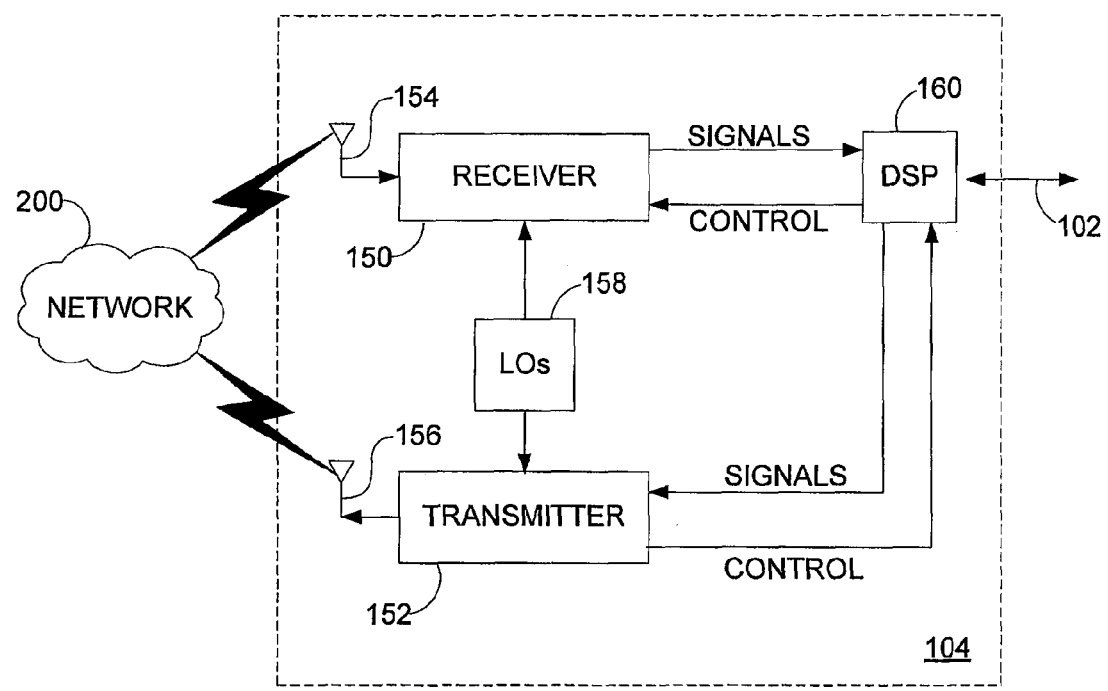
FIG. 2 is a block diagram of a communication subsystem component of the mobile device of FIG. 1.
Figure 3:
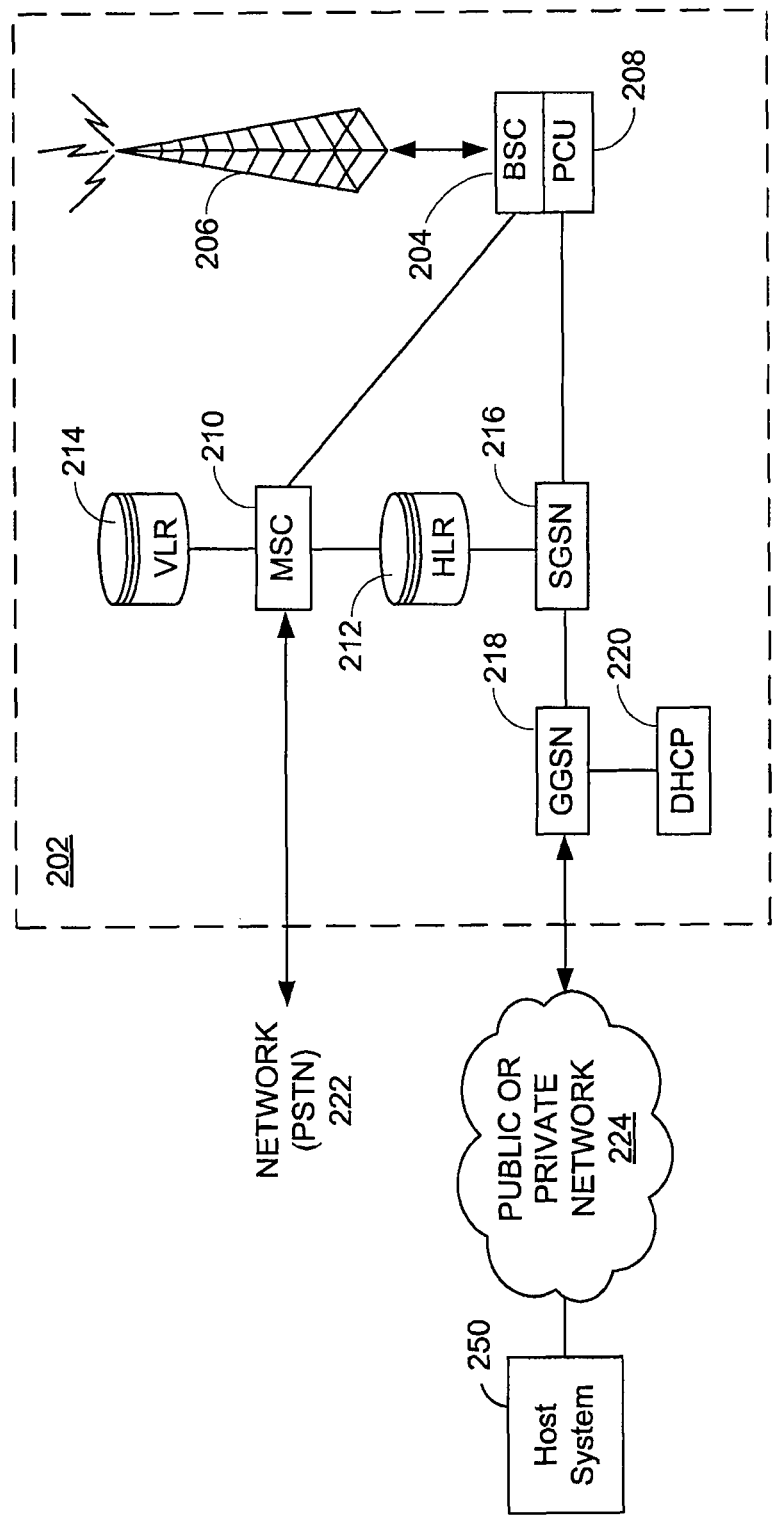
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, may be performed through communication subsystem 104. Communication subsystem 104 may be configured to receive messages from and send messages to a wireless network 200. In one example implementation of mobile device 100, communication subsystem 104 may be configured in accordance with the Global System for Mobile Communication (GSM) and General Packet Radio Services (GPRS) standards. The GSM/GPRS wireless network is used worldwide and it is expected that these standards may be supplemented or superseded eventually by Enhanced Data GSM Environment (EDGE) and Universal Mobile Telecommunications Service (UMTS), and Ultra Mobile Broadband (UMB), etc. New standards are still being defined, but it is believed that they will have similarities to the network behaviour described herein, and it will also be understood by persons skilled in the art that the embodiments of the present disclosure are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems. Other network communication technologies that may be employed include, for example, Integrated Digital Enhanced Network (iDEN™), Evolution-Data Optimized (EV-DO), and High Speed Packet Access (HSPA), etc.

Microprocessor 102 may also interact with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, as well as device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after network registration or activation procedures have been completed. Network access may be associated with a subscriber or user of a mobile device 100. To identify a subscriber, mobile device 100 may provide for a Subscriber Identity Module ("SIM") card 126 to be inserted in a SIM interface 128 in order to communicate with a network. SIM 126 may be one example type of a conventional "smart card" used to identify a subscriber of mobile device 100 and to personalize the mobile device 100, among other things. Without SIM 126, mobile device 100 may not be fully operational for communication with network 200. By inserting SIM 126 into SIM interface 128, a subscriber may access all subscribed services. Services may include, without limitation: web browsing and messaging such as e-mail, voice mail, Short Message Service (SMS), and Multimedia Messaging Services (MMS). More advanced services may include, without limitation: point of sale, field service and sales force automation. SIM 126 may include a processor and memory for storing information. Once SIM 126 is inserted in SIM interface 128, it may be coupled to microprocessor 102. In order to identify the subscriber, SIM 126 may contain some user parameters such as an International Mobile Subscriber Identity (IMSI). By using SIM 126, a subscriber may not necessarily be bound by any single physical mobile device. SIM 126 may store additional subscriber information for a mobile device as well, including datebook (or calendar) information and recent call information.

Mobile device 100 may be a battery-powered device and may comprise a battery interface 132 for receiving one or more rechargeable batteries 130. Battery interface 132 may be coupled to a regulator (not shown), which assists battery 130 in providing power V+ to mobile device 100. Although current technology makes use of a battery, future technologies such as micro fuel cells may provide power to mobile device 100. In some embodiments, mobile device 100 may be solar-powered.

Microprocessor 102, in addition to its operating system functions, enables execution of software applications on mobile device 100. A set of applications that control basic device operations, including data and voice communication applications, may be installed on mobile device 100 during its manufacture. Another application that may be loaded onto mobile device 100 is a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality may create a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication include standards developed by the Infrared Data Association (IrDA), Bluetooth®, and the 802.11 family of standards (Wi-Fi®) developed by IEEE.

In use, a received signal such as a text message, an e-mail message, or web page download is processed by communication subsystem 104 and input to microprocessor 102. Microprocessor 102 then processes the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, optical trackpad, infrared fingerprint detector, or a roller wheel with dynamic button pressing capability. Keyboard 116 may comprise an alphanumeric keyboard and/or telephone-type keypad, for example. A composed item may be transmitted over network 200 through communication subsystem 104.

For voice communications, the overall operation of mobile device 100 may be substantially similar, except that the received signals may be processed and output to speaker 118, and signals for transmission may be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 may comprise a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate; thus, it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is generally a limited resource, typically due to limits in overall bandwidth and limited battery power of mobile device 100.

When mobile device 100 is fully operational, transmitter 152 may be typically keyed or turned on only when it is sending to network 200 and may otherwise be turned off to conserve resources. Similarly, receiver 150 may be periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with GPRS and GSM technologies; however, in other embodiments, different standards may be implemented as discussed in more detail above. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) server 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 may be a fixed transceiver station. Station 206 and BSC 204 together may form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile may be stored in HLR 212. HLR 212 may also contain location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times while requiring less use of computing resources.

SGSN 216 and GGSN 218 are elements that may be added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSNs 216 via an Internet Protocol (IP) backbone network operated within the network 200. During normal operations, a given mobile device 100 performs a "GPRS Attach" to acquire an IP address and to access data services. This normally is not present in circuit switched voice channels as Integrated Services Digital Network (ISDN) addresses may be generally used for routing incoming and outgoing calls. Currently, GPRS capable networks may use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server, for example. Once the GPRS Attach is complete, a logical connection is established from a mobile device 100, through PCU 208, and SGSN 216 to an Access Point Node (APN) within GGSN 218, for example. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot generally exchange data without first performing a GPRS Attach to an APN that it has been authorized to use. The APN may be considered to be similar to an Internet domain name such as "myconnection.wireless. com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
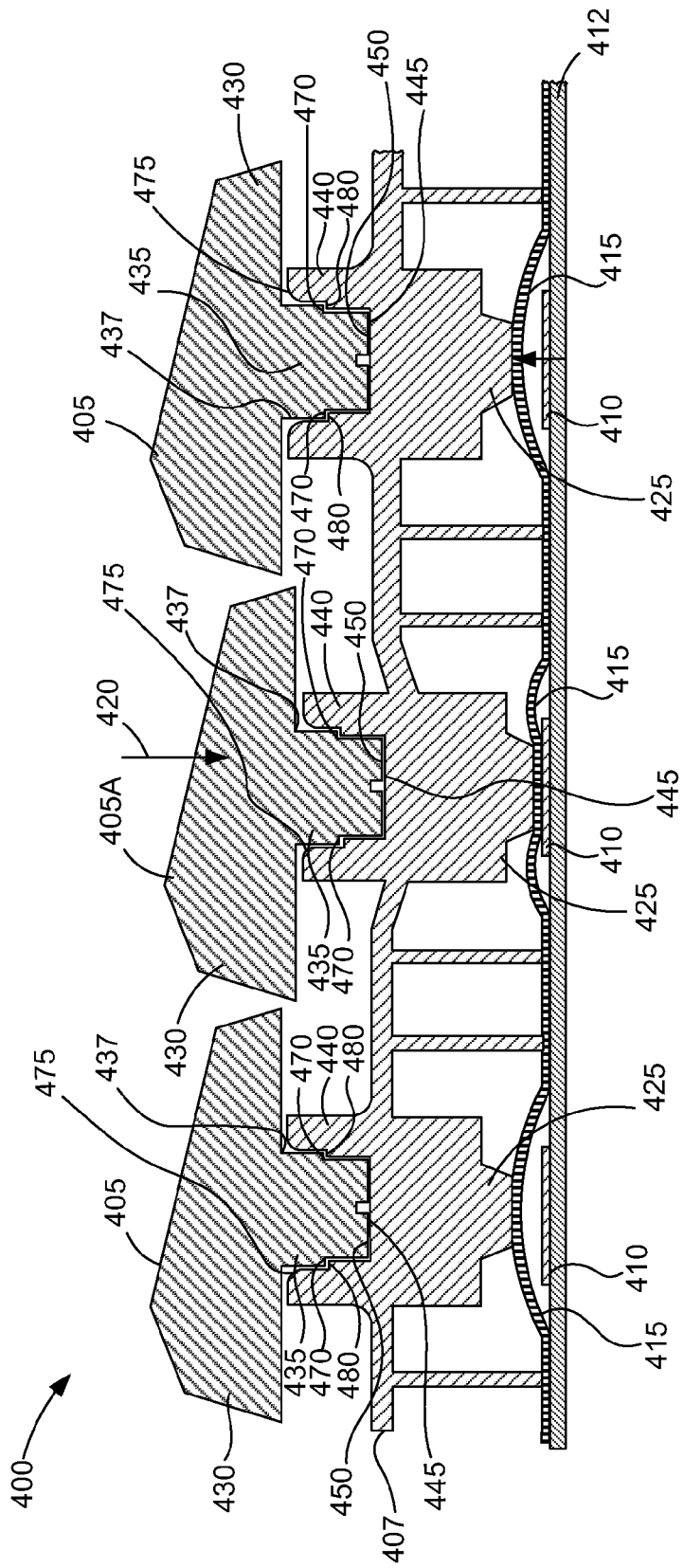
FIG. 4 is a section view of a keypad according to one embodiment.

Referring now to FIG. 4, a keypad assembly according to an embodiment is shown generally as 400. The keypad assembly 400 may be used within electronic devices, such as the mobile device 100 described above. For example, the keypad assembly 400 may comprise part of the keyboard 116.

The keypad assembly 400 comprises one or more keys 405 which may be arranged on a deflection web 407. The deflection web 407 may comprise a flexible material such as silicone. Each of the keys 405 is operatively coupled to at least one switch sensor 410. The switch sensor 410 detects if the corresponding key 405 has been pressed and if so, it generates a corresponding signal on a printed circuit board 412.

Separating a key 405 from its corresponding switch sensor 410 may be a corresponding metal dome 415 which is operatively coupled to the sensor switch 410. The metal dome 415 may be configured to collapse and contact the sensor switch 410 when the corresponding key 405 is depressed in a key press direction 420. The middle key 405A is an example of a key 405 that has been so depressed. The keys 405 may be configured to operatively engage the metal domes 415 via actuators 425. The actuators 425 may comprise part of and extend from the deflection web 407. Specifically, an actuator 425 may be positioned between a key 405 and a metal dome 415 and it may transfer the key depression force, onto the metal dome 415. Persons skilled in the art will understand that the metal domes 415 and the switch sensors 410 may operate like dome switches known in the art.

Each key 405 may comprise a key cap 430 and a post 435. The post 435 may be operatively coupled to the key cap 430. For example, the post 435 may be adhered (by adhesive or otherwise) or integrally formed with the key cap 430 at a first end 437 of the post 435. In the example illustrated by FIG. 4, the posts 435 are integrally formed with the key caps 430 at the first end 437 of the post 435. The key cap 430 and the post 435 may be made from suitably hard and resilient material(s) (such as plastic or silicone) so as to produce a good tactile feel when the key 405 is depressed.

Each post 435 may be received in a corresponding seat 440 of the deflection web 407. The posts 435 may be retained in their corresponding seats 440 using an adhesive such as glue. The adhesive may be applied to the post 435 and/or the seat 440. In some embodiments, during the assembly of the keypad assembly 400, a glue drop may be placed on a base (or closed end) 445 of the seat 440 or a bottom (or second end) 450 of a post 435 before the post 435 of a key 405 is inserted into the seat 440 of the deflection web 407. In these embodiments, when the bottom 450 of the post 435 meets the base 445 of the seat 440 the glue drop is compressed and spreads to fill the spaces between the post 435 and the seat 440. Specifically, the glue fills the voids between the base 445 of the seat 440 and the bottom 450 of the post 435 as well as between a side 455 of the post 435 and a periphery 460 of the seat 440.

Figure 5:
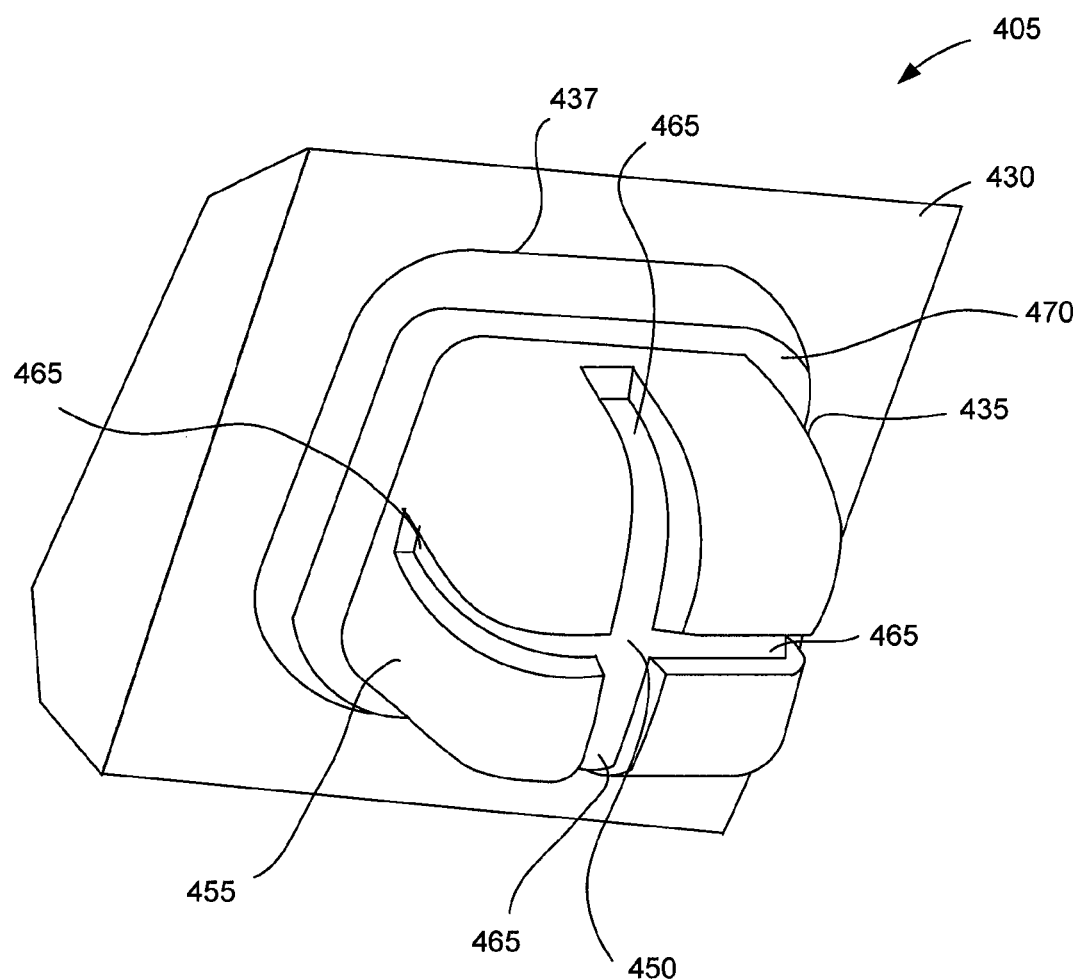
FIG. 5 is perspective view of a key according to one embodiment.
Figure 6:
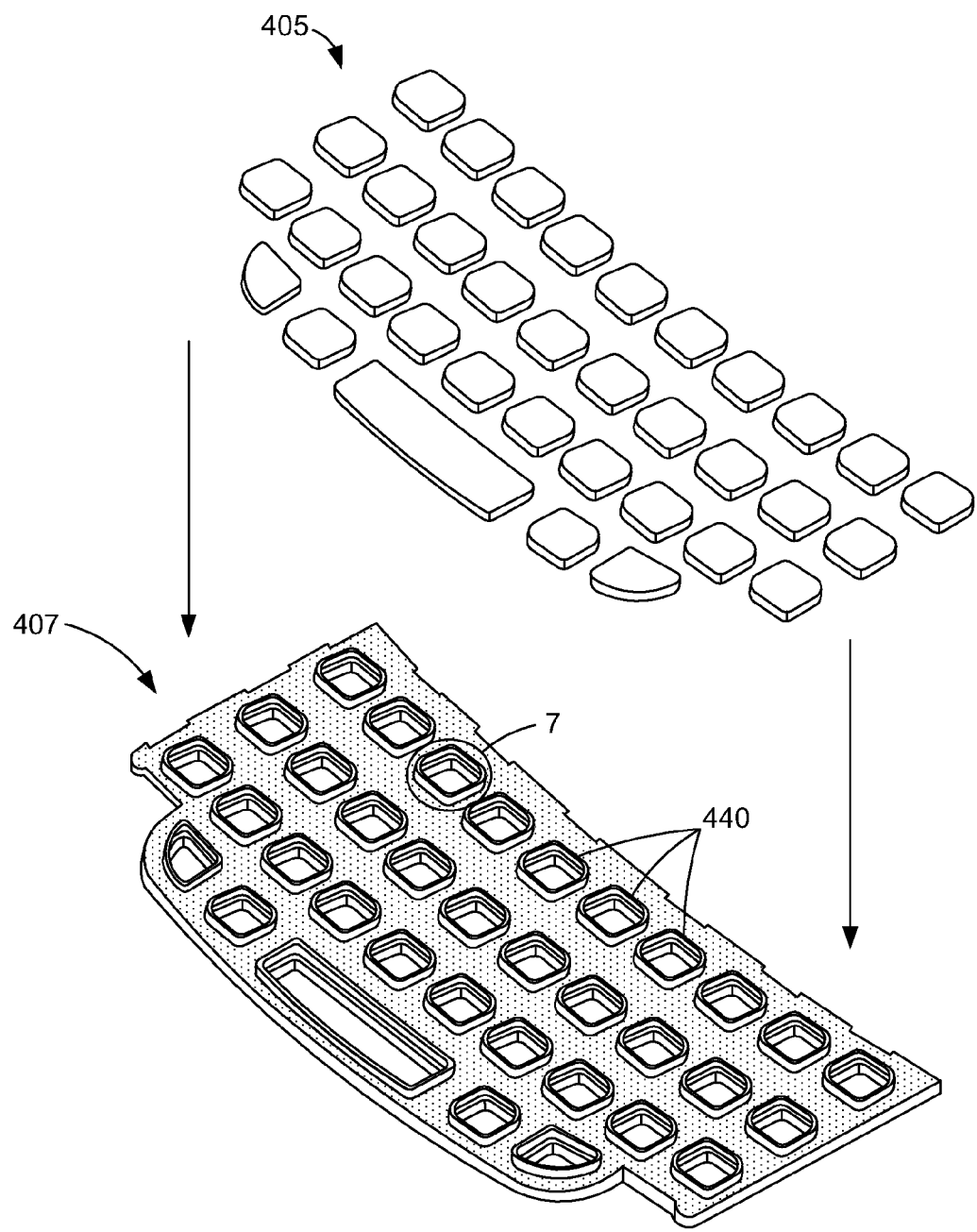
FIG. 6 is an exploded perspective view of selected elements of a keypad according to one embodiment.

FIG. 5 shows a key 405 according to one embodiment. The key 405 comprises a key cap 430 and a post 435. The key cap 430 may have any suitable shape for example, such as an angled face, as illustrated in FIGS. 4 and 5, or a flatter configuration as illustrated in FIG. 6. The post 435 may comprise one or more channels 465 configured for receiving and distributing the adhesive, and which may also permit venting of any trapped air during assembly. The channels 465 may be substantially uniformly arranged about the circumference of the post 435. Also, at least one of the channels 465 may intersect at least one other of the channels 465. In the example illustrated by FIG. 5, the post 435 includes four regularly distributed channels 465 all of which intersect at the bottom 450 of the post 435. Persons skilled in the art will understand that although the example post 435 shown in FIG. 5 has a square cross-sectional shape with one channel 465 per each of the four faces or sides of the post 435, the post 435 may have any suitable cross-sectional shape and any configuration of channels 465. For example, the cross-sectional shape of the post 435 may be circular (permitting various numbers of evenly distributed channels 465), triangular (permitting, for example, three channels 465 with one per face), pentagonal (permitting, for example, five channels 465 with one channel per face), irregularly eight sided (permitting, for example, eight channels 465 with one per face) or any other shape. Further, each face of the post 435 may be provided with zero, one or more channels 465. Also, in some embodiments, the channels 465 may be asymmetrically arranged about the side 455 of the post 435. Further, any suitable shape or configuration of the channels 465 for distributing the adhesive may be utilized, provided that the number and configuration of the channels 465 do not negatively affect the required structural integrity of the post 435 or otherwise negatively inhibit the process of manufacturing the key (such as injection molding).

The provision of channels 465 on the post 435 may provide better glue distribution about the space between the base 445 of the seat 440 and the bottom 450 of the post 435 as well as between the side 455 of the post 435 and the periphery 460 of the seat 440. Further, providing channels which are evenly distributed about the side 455 of the post 435 may provide the potential advantage of more even glue distribution and consequently more even bonding. This may result in lower peak shear forces in the bonded regions thus reducing the likelihood of the key 405 falling out of the seat 440.

The adhesive may be a liquid glue which is suitably inviscid to permit the adhesive to flow through the channels 465 during the insertion of the post 435 into the seat 440. Following insertion, the adhesive may be allowed to dry on its own or it may be cured by light or heat during the manufacturing process. The adhesive may be one with sufficient adhesive strength to permanently adhere the post 435 to the seat 440 following the manufacturing process.

Referring now to FIG. 6, an exploded view of the keypad assembly 400 is shown according to an embodiment. Each key 405 may correspond to a seat 440 in the deflection web 407. The keys 405 and the seats 440 may be arranged according to any pattern or configuration. In the example of FIG. 6, the keys 405 and the seats 440 are arranged to suit a full QWERTY keypad. In other embodiments, the keys 405 and the seats 440 may be arranged to suit a conventional twelve key keypad (0-9, #, *), a full 104-key QWERTY computer keyboard or even a single key configuration (e.g. for a mobile device).

Figure 7:
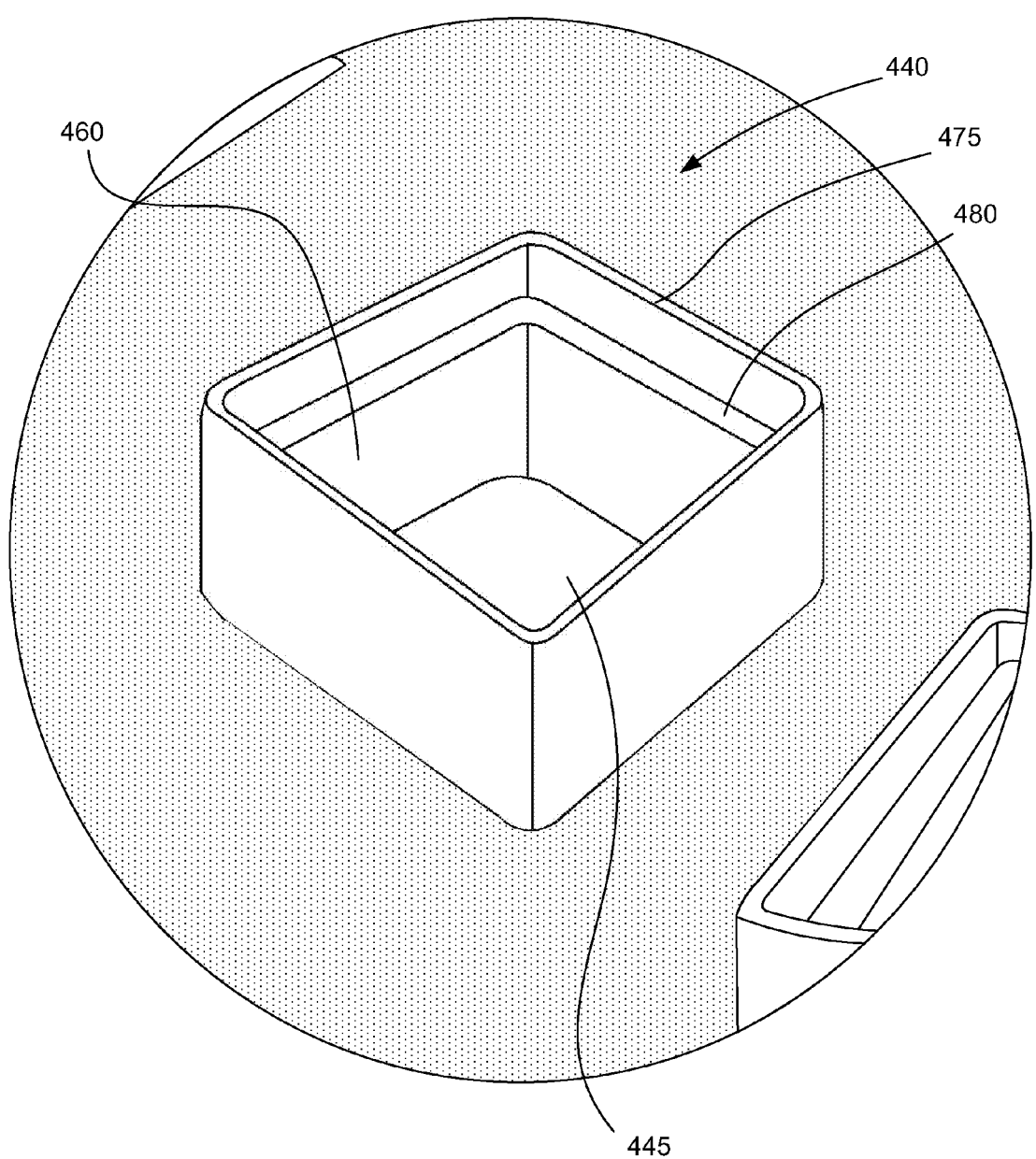
FIG. 7 is an enlargement of the portion of the deflection web of FIG. 6 within the circle 7 illustrating a cavity of a seat.

Reference will now be made to FIG. 7 which shows an enlargement of the portion of the keypad of FIG. 6 within the circle 7 including a seat 440. Each seat 440 may comprise an open end 475 and a closed end (or bottom) 445 remote from the open end 475. Also, the seat 440 may comprise a shoulder 480 intermediate the open end 475 and the closed end 445.

As shown in FIG. 5, the post 435 of the key 405 may also comprise a flange 470 which extends around a periphery of the post 435. In some implementations, the flange 470 may have a shape corresponding to the cross-sectional shape of the post 435. The flange may be adhered (by adhesive or otherwise) or integrally formed with the post 435. The flange 470 may be positioned on the post 435 intermediate the first end 437 and the bottom 450. Also, the flange 470 may be proximate the key cap 430 to maximize the length of the channels 465 and correspondingly the adherence of the post 435 to the seat 440. If the key 405 (and flange 470) is manufactured using an injection molding process, locating the flange 470 proximate the key cap 430 may also prevent the need for an undercut which could be both costly and difficult to implement. In the example illustrated by FIGS. 4 and 5 the flange 470 is proximate the first end 437 of the post 435. As shown in the example illustrated by FIG. 4, when a post 435 of a key 405 is received in a seat 440 of the deflection web 407, the flange 470 may be configured to mate with the shoulder 480. In some implementations, the outer periphery of the flange 470 and the shoulder 480 may be correspondingly configured such that the flange 470 and shoulder 480 fit together. A gap may be provided between the flange 470 and the shoulder 480 which may offer assembly tolerances for manufacturing and may permit venting of air trapped inside the seat 440. A gap may also be provided between the underside of the flange 470 and the upper surface of the shoulder 480 which may impede the glue from coming out of the seat 440, and may also reduce or avoid any pressure inside this area which might otherwise cause a deformation.

Embodiments which provide mating flanges 470 and shoulders 480 may provide additional contact surface area between the key 405 and the seat 440 for an adhesive thereby increasing pullout strength (i.e. the strength of a key 405 to resist being pulled out of its seat 440). Further, the provision of a mating flange 470 and shoulder 480 may inhibit glue from escaping out of the open end 475 of the seat 440. For example, when the post 435 is inserted into the seat 440 and the glue drop is compressed, the glue may spread upwardly on all sides 455 of the post 435 until the glue meets the flange 470. The flange 470 may prevent glue from escaping out of the open end 475 of the seat 440 and push the glue back down during insertion of the post 435. The glue may then redistribute between the post 435 and the seat 440. This may enhance even adherence of the glue. Additionally, this may prevent glue from escaping the seat 440 and bonding the key cap 430 directly to the deflection web 407. Directly bonding the key cap 430 to the deflection web 407 can result in increased peak shear stresses in the bonded regions which might otherwise cause tearing of the deflection web 407.

Persons skilled in the art will understand that in some embodiments, the key 405 may be provided with one or more channels 465 but not provided with a flange 470. However, such a configuration would not necessarily prevent the glue from adhering the key cap 430 to the deflection web 407. In embodiments where both channels 465 and a flange 470 are provided the channels 465 may extend between the flange 470 and the bottom 450 of the post 435. In the example shown in FIG. 5, the channels 465 extend from the bottom 450 upwards and stop just short of the flange 470. This may permit the channels 465 to help evenly distribute the glue about the spaces between the post 435 and the seat 440 without permitting the glue to bypass the flange 470 as might be the case if the channels 465 extended beyond the flange 470. Additionally, it should be understood that in some embodiments, the key 405 may be provided with a flange 470, but without any channels 465.

Figure 8:
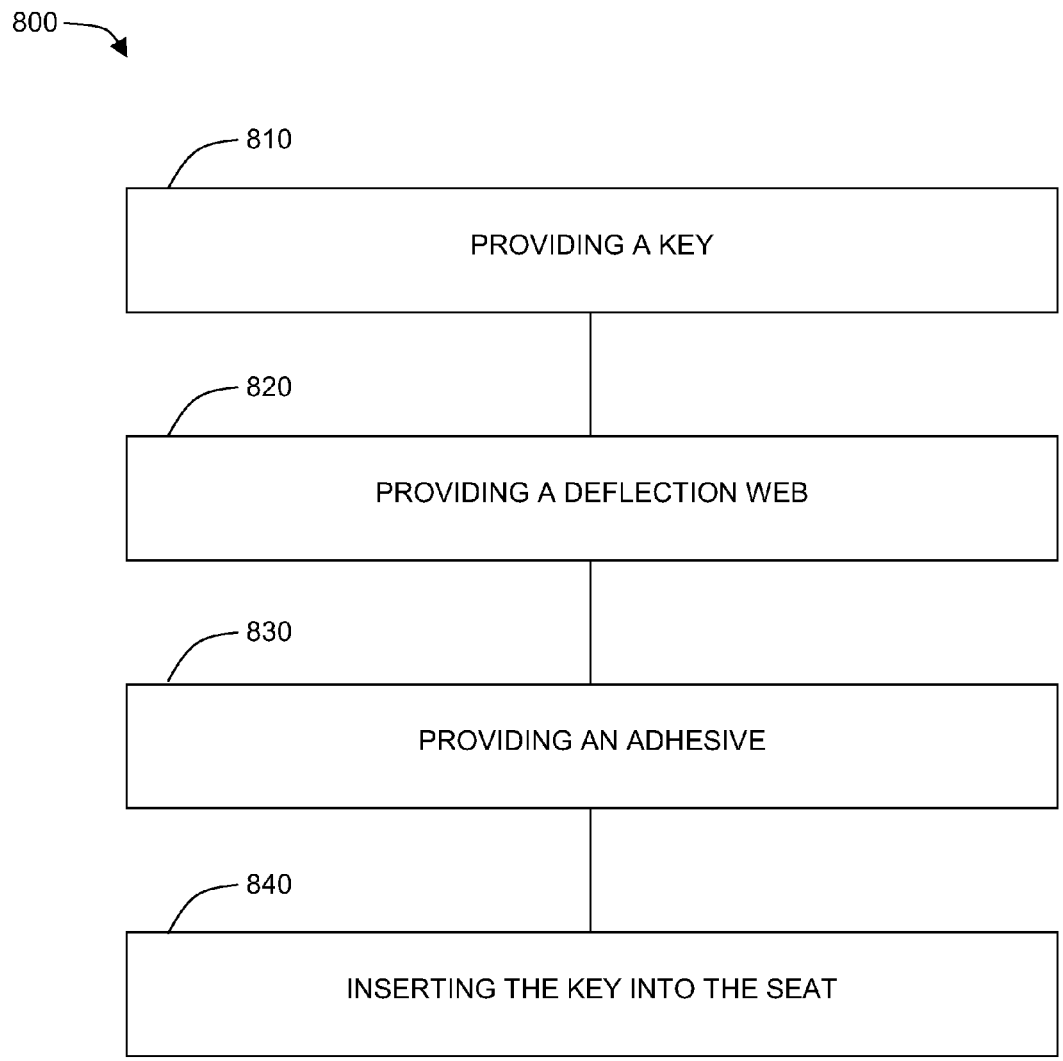
FIG. 8 is a logical flow diagram of a method of making a keypad according to the present disclosure.

Referring now to FIG. 8, a method (generally referred to as 800) for making a keypad 400 is shown. At Block 810, a key 405 is provided. The key 405 may be a key 405 according to any embodiment described above. For example, the key 405 may comprise a key cap 430 and a post 435 operatively coupled to the key cap 430. Also, the post 435 may comprise one or a plurality of channels 465.

At Block 820 a deflection web 407 is provided. The deflection web 407 may be a deflection web 407 according to any embodiment described above. For example, the deflection web 407 may comprise at least one seat 440 configured to receive the post 435 of the key 405.

At Block 830 an adhesive is provided. The adhesive may be provided proximate the base 445 of the seat 440. In some embodiments, the adhesive may be provided on the base 445 of the seat 440 in the form of a drop of liquid adhesive such as glue, for example. Alternatively or in addition, the adhesive may be provided on the post 435 of the key 405.

At Block 840 the key 405 is inserted into the seat 440. The adhesive may interact with the features of the key 405 (such as the post 435) and the seat 440 as described above. For example, if the key 405 is provided with a flange 470, the seat 440 is provided with a shoulder 480, and the adhesive is a glue drop, then upon inserting the key 405 into the seat 440 the glue may spread to fill the space between the post 435 and the seat 440 and the flange may act to push down glue which might otherwise escape out of the open end 475 of the seat 440.

With the key 405 inserted into the seat 440, the glue may be allowed to dry on its own or it may be cured by light or heat. The assembled deflection web 407 and key(s) 405 may then be assembled with a printed circuit board 412, switch sensor(s) 410, and metal dome(s) 415 to form a keypad.

The steps of a method in accordance with any of the embodiments described herein may not be required to be performed in any particular order, whether or not such steps are described in the claims or otherwise in numbered or lettered paragraphs.

The keypad assembly has been described with regard to a number of embodiments. However, it will be understood by persons skilled in the art that other variants and modifications may be made without departing from the scope of the disclosure as defined in the claims appended hereto.

The invention claimed is:

1. A key for a keypad comprising:
   a key cap; and
   a post operatively coupled to the key cap;
   wherein the post comprises a plurality of channels, wherein at least one of the plurality of channels intersects at least one other of the plurality of channels; and
   wherein the post further comprises a flange.

2. The key of claim 1, wherein the plurality of channels are substantially uniformly arranged about the post.

3. The key of claim 1, wherein the flange is proximate the key cap.

4. The key of claim 1, wherein the key cap is positioned proximate a first end of the post, and wherein the plurality of channels extend between a second end of the post and the flange.

5. The key of claim 1, wherein the key cap is operatively coupled to the post at a first end of the post and at least one of the plurality of channels extends from proximate the first end of the post to a second end of the post.

6. The key of claim 1, wherein the key cap is operatively coupled to the post at a first end of the post and the flange is positioned on the post intermediate the first end of the post and a second end of the post.

7. A keypad assembly comprising:
   at least one key having a post and a key cap;
   wherein the post comprises a plurality of channels, wherein one of the plurality of channels intersects at least one other of the channels; and
   a deflection web including at least one seat configured to receive the post;
      wherein the seat comprises an open end and a closed end remote from the open end; and
      wherein the seat comprises a shoulder intermediate the open end and the closed end.

8. The keypad assembly of claim 7, wherein the post comprises a flange; and
   wherein the shoulder is configured to mate with the flange when the key is received in the seat.

9. The keypad assembly of claim 8, wherein the flange is proximate the key cap.

10. The keypad assembly of claim 8, wherein the key cap is positioned proximate a first end of the post, and wherein the channels extend between a second end of the post and the flange.

11. The keypad assembly of claim 7, wherein the key cap is operatively coupled to the post at a first end of the post and at least one of the plurality of channels is defined in the post and extends from proximate the first end of the post to a second end of the post.

12. The keypad assembly of claim 8, wherein the key cap is operatively coupled to the post at a first end of the post and the flange is positioned on the post intermediate the first end of the post and a second end of the post.

13. A method of making a keypad, wherein the method comprises:
   providing a key comprising a key cap and a post operatively coupled to the key cap,
   wherein the post comprises a plurality of channels, wherein one of the plurality of channels intersects at least one other of the channels;
   providing a deflection web comprising a seat configured to receive the post of the key;
   providing an adhesive on the post of the key; and
   inserting the post of the key into the seat.

14. The method of claim 13, wherein the seat comprises an open end and a closed end remote from the open end; and
   wherein the adhesive is provided proximate the closed end of the seat.

15. The method of claim 13, wherein the adhesive is provided on a bottom of the post.

16. The method of claim 13, wherein the seat comprises an open end and a closed end remote from the open end; and
   wherein the seat comprises a shoulder intermediate the open end and the closed end.

17. The method of claim 16, wherein the post comprises a flange; and
   wherein the shoulder is configured to mate with the flange when the key is received in the seat.

18. The key of claim 1, wherein the flange extends around an entire periphery of the post.

19. The key of claim 1, wherein the flange includes a shape that corresponds to a cross-sectional shape of the post.

20. The key of claim 1, wherein the post includes a plurality of post sides, and the flange extends around at least two of the plurality of post sides.

21. The key of claim 4, wherein the plurality of channels only extend between the second end and the flange.

22. The key of claim 1, wherein the post is integrally formed with the key cap.

23. The key of claim 1, wherein the post comprises a solid body.

* * * * *